No. 875,284. PATENTED DEC. 31, 1907.
H. N. POTTER.
GRANULAR FURNACE.
APPLICATION FILED MAY 14, 1904.

5 SHEETS—SHEET 1.

Witnesses
Chas. F. Clagett
Wm. H. Capel

Inventor
Henry Noel Potter
By his Attorney
Charles A. Terry

No. 875,284.
PATENTED DEC. 31, 1907.
H. N. POTTER.
GRANULAR FURNACE.
APPLICATION FILED MAY 14, 1904.
5 SHEETS—SHEET 2.
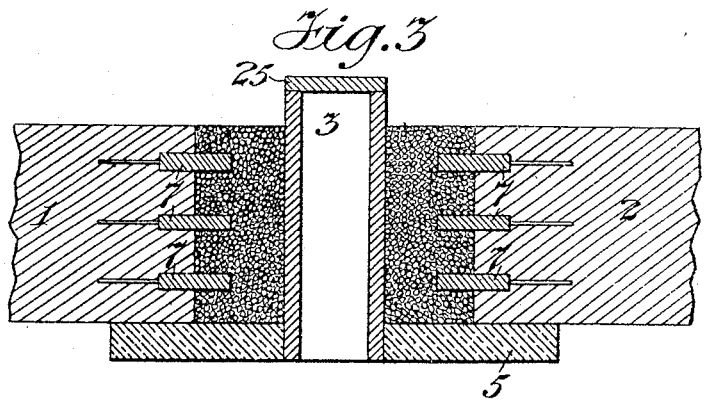
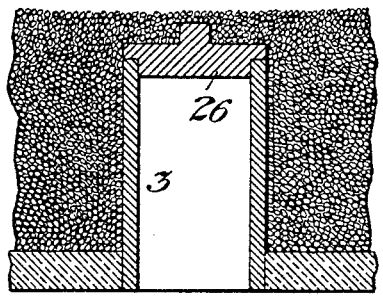
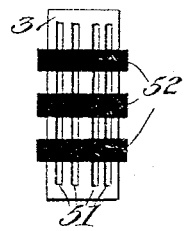
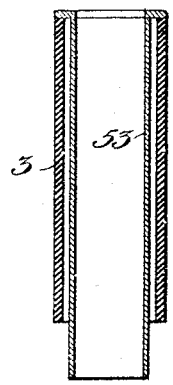
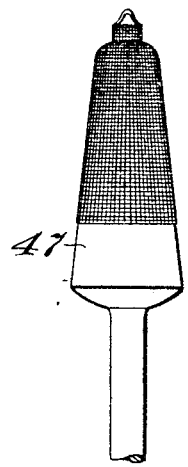
Witnesses
Chas. F. Clagett
W. H. Capel
Inventor
Henry Noel Potter
By his Attorney
Charles A. Terry No. 875,284. PATENTED DEC. 31, 1907.
H. N. POTTER.
GRANULAR FURNACE.
APPLICATION FILED MAY 14, 1904.
5 SHEETS—SHEET 3.
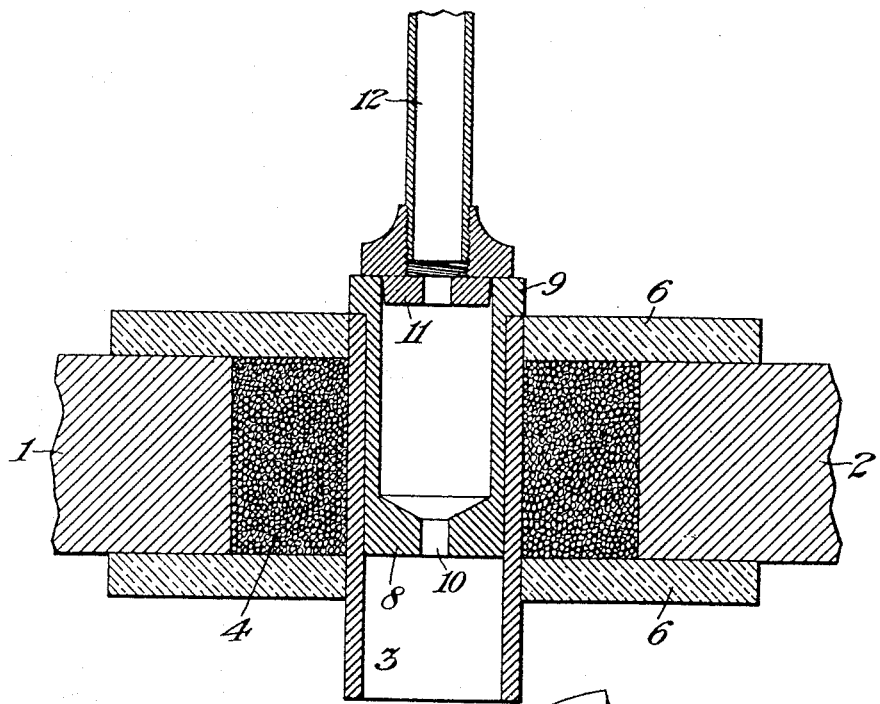
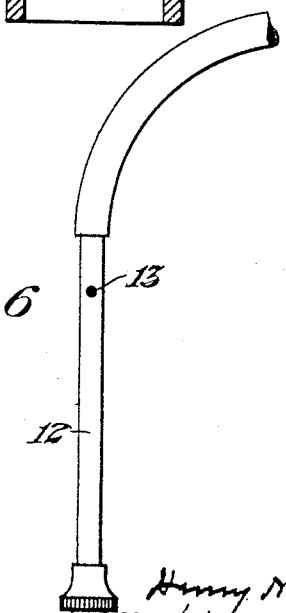

No. 875,284. PATENTED DEC. 31, 1907.
H. N. POTTER.
GRANULAR FURNACE.
APPLICATION FILED MAY 14, 1904.

5 SHEETS—SHEET 4.

No. 875,284.       PATENTED DEC. 31, 1907.
H. N. POTTER.
GRANULAR FURNACE.
APPLICATION FILED MAY 14, 1904.

5 SHEETS—SHEET 5.

UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

GRANULAR FURNACE.

No. 875,284.  Specification of Letters Patent.  Patented Dec. 31, 1907.

Application filed May 14, 1904. Serial No. 208,044.

*To all whom it may concern:*

Be it known that I, HENRY NOEL POTTER, a citizen of the United States, and resident of New Rochelle, county of Westchester, State of New York, have invented certain new and useful Granular Furnaces, of which the following is a specification.

I have devised and operated a peculiar form of electric furnace, which is particularly practicable to such uses as require that an object or charge be heated under constant supervision, and be immediately removed from the furnace upon the occurrence of some reaction or change of state. This furnace has been used for producing, melting and casting vapor lamp electrodes of various alloys, such as ferro-aluminium, chromium aluminium, ferro-silicon, silicon copper, and so forth; also for baking and hardening Welsbach mantles, especially the heads of such mantles; and also for softening and squirting vitrified silica, and for drawing and shaping articles of silica.

The arrangement is very cheap and handy, is applicable to any use possible for a tube furnace and has the advantage over ordinary tube furnaces of not requiring awkwardly heavy currents at very low voltages, and also that of permitting the tube to be heated to its ends instead of only its middle portion, as is the case where the ends extend into special contacts or terminals.

The invention is illustrated in the accompanying drawing, in which

Figure 1:
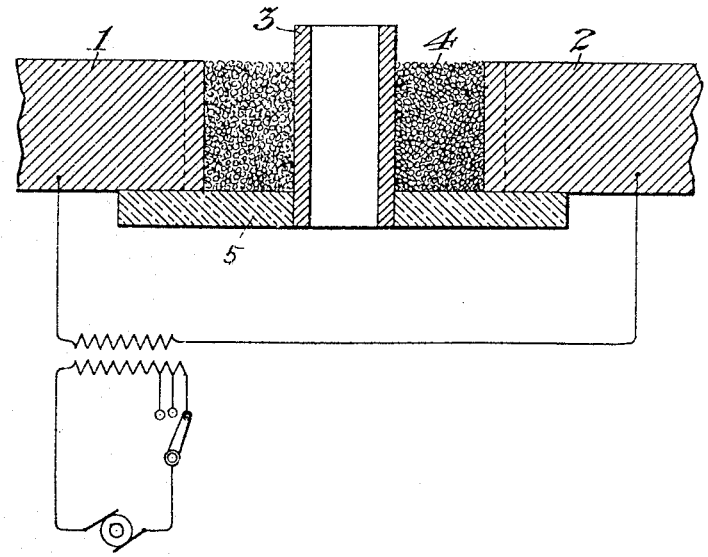
Figure 2:
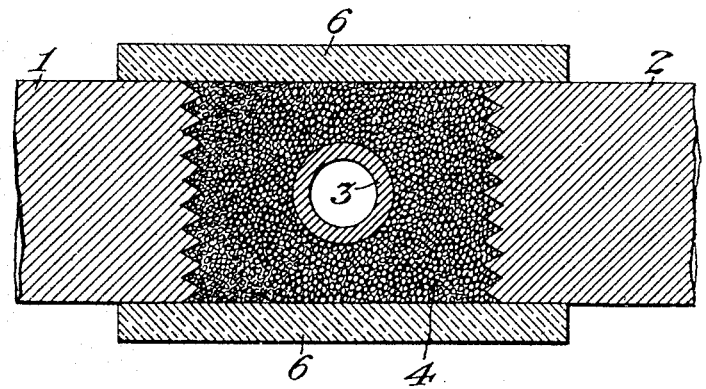
Figure 7:
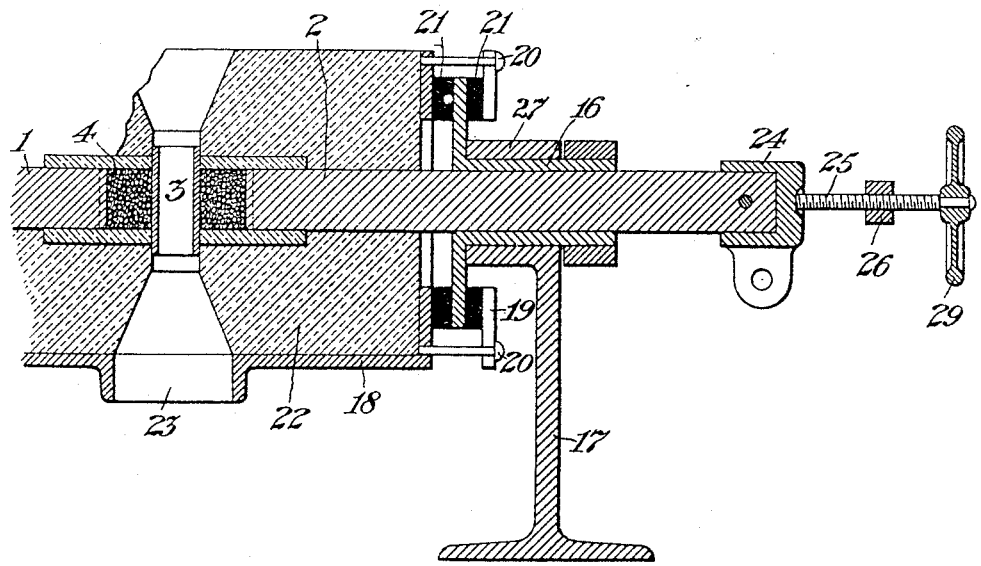
Figure 8:
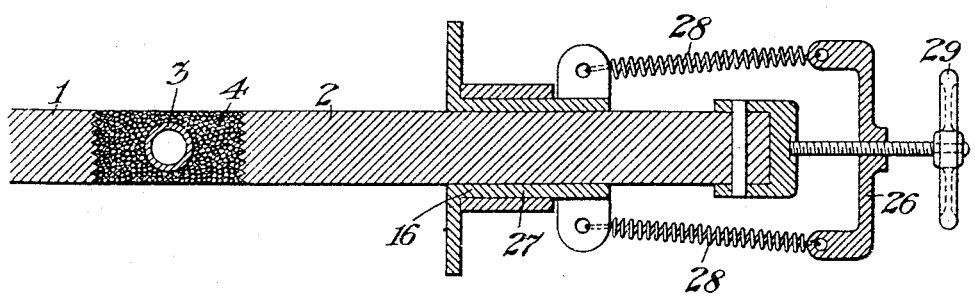
Figure 9:
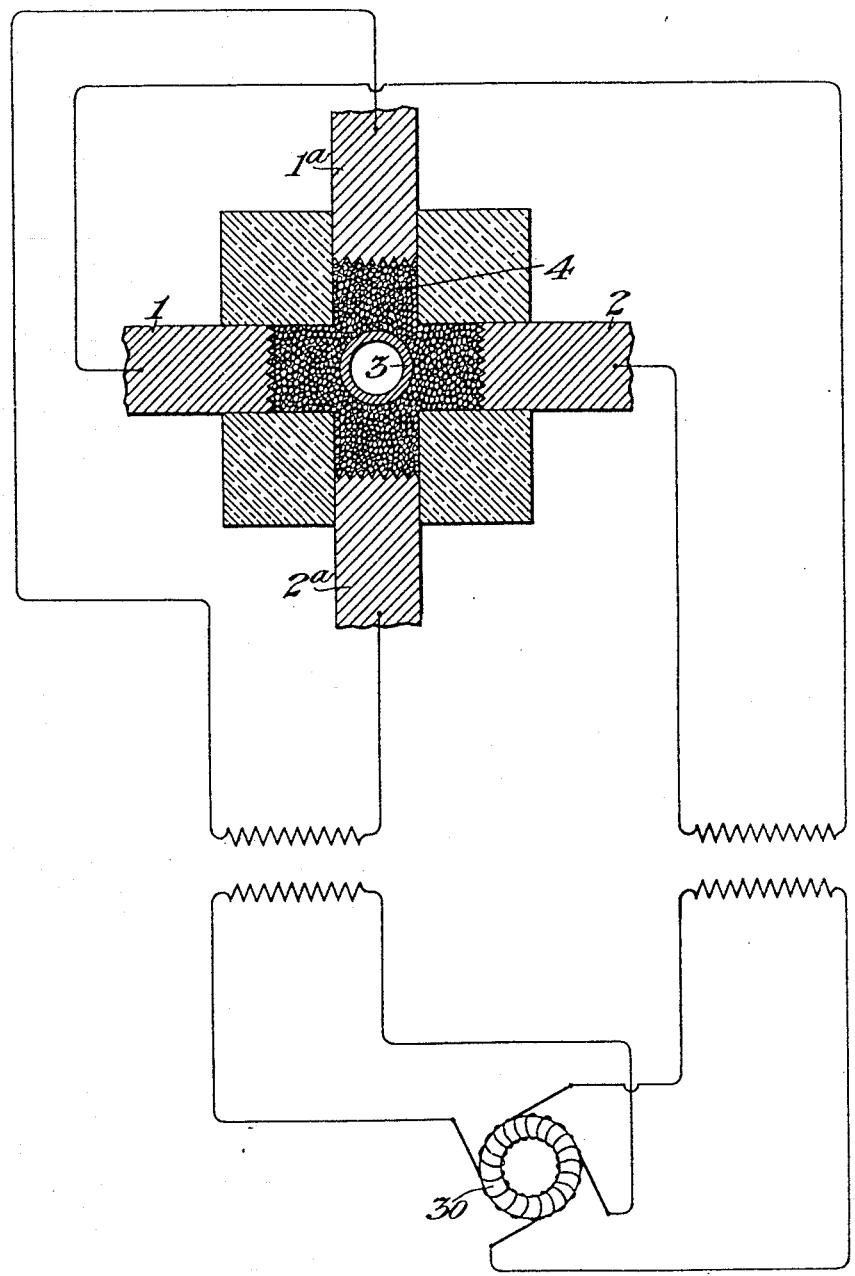

Figure 1 represents a section through a furnace parallel to the axis of the tube; Fig. 2 shows a section at right angles to the axis of the tube; Fig. 3 is a detail view; Fig. 4 illustrates a form of furnace particularly adapted to the treatment of Welsbach mantles; Fig. 4$^a$ is an elevation of a mandrel and mantle adapted to be heated by the type of furnace shown in Fig. 4; Fig. 5 is a sectional view of a furnace for squirting plastic silica into rods and tubes; Fig. 6 is a detail view; Fig. 7 is a sectional view of a furnace, showing its mechanical connections; Fig. 8 is a sectional view, the section being taken at right angles to that of Fig. 7; Fig. 9 illustrates a modification, and Figs. 10 and 11 show modified details.

Referring to the first figure of the drawings, 1 and 2 are graphite electrodes, 3 is a graphite tube. The space surrounding the tube 3 is packed with a mass of graphite or carbon broken into small granules. A good material for this purpose consists of coke and this may be improved by tumbling it together with finely powdered graphite which coats each grain of coke and assists in establishing contact from piece to piece. Wherever practicable, however, I prefer granular graphite, as it is unlike amorphous carbon in that it does not change its resistance much with a change of temperature and, therefore, requires less regulation and attention in starting up.

In Fig. 2 the confronting faces of the electrodes 1 and 2 are shown serrated, as I find it advantageous to increase the surfaces which are in contact with the granular resistance so as to minimize arcing and consequent excessive wear at these surfaces. In view of the importance of this feature, I have devised and constructed several different arrangements of electrode faces. For example, I have made the faces separable and renewable pieces mortised, screwed, wedged, or set into the electrode body. One such construction is illustrated in Fig. 3, where short removable slabs, 7, 7, 7, of graphite are slipped into slots in the electrodes 1 and 2 and project into the granular mass. This permits the electrodes to be moved forward and backward slightly, thereby changing the pressure upon the granular resistance. By this means, a very effective and simple method of regulating the current flow through the furnace is provided.

The granular resistance is held in place on the bottom and sides by refractory walls, 5 and 6, respectively, of carborundum, or other suitable material. The tube 3 is held in place largely by the granular material, but may also have other supports, which are often an advantage, as they hold the tube 3 in place while the granular resistance is built up around it.

In Fig. 1, the tube 3 is shown open at both ends, but for melting operations and in other particular cases it may be well to have the bottom closed to prevent rapid burning out by reason of air currents. In the form of tube which is open at both ends, a cover, 25, is generally provided, and should be kept in place during the heating up and cooling down to minimize the wear by oxidation.

In Fig. 4 the tube there is shown open at the bottom and closed at the top by a cap, 26, which is buried beneath the granular material. This form of furnace is especially suited to the heating of Welsbach mantles. The mantle is set on a form or mandrel, 47, and pushed up from below into the hot tube. This form of furnace has advantages also for melting materials which must be kept in a reducing atmosphere of carbon monoxid during the treatment by heat. In place of the mantle and form shown in Fig. 4 the melting pot and charge are pushed up from below, as will be readily understood.

For squirting plastic silica into rods and tubes the furnace is arranged with a tube open at both ends as in Fig. 1. A special form of furnace for this purpose is illustrated in Fig. 5. A press tube, 8, is fitted into the upper end of the tube 3, the press tube being provided with a supporting shoulder, 9. This press tube 8 has at its lower end a contracted opening, 10, of the size desired in the squirted silica. It is well to have this opening 10 longer than is necessary to form the silica as the latter has a very wearing action and soon enlarges the opening. The upper end of the tube 8 is fitted with a tight cap 11 bored with an opening connecting to a tube 12 (see Fig. 6) through which compressed air is blown. In the tube 12 is an opening, 13, in shunt to the air current so to speak. In action silica is placed in the tube 8 and rendered plastic. When this state is observed the cover 11 is put in place and the finger placed over the hole 13. The air no longer able to escape through 13, drives the plastic silica through opening 10 and it falls into a pail of water.

It is obviously possible to provide a lining or inner tube within the tube 3; this lining may be preferably made of a refractory and difficultly reducible oxid, there being no irreducible oxid. The speed of destruction of the lining tube may be reduced by keeping it out of contact with the carbon tube. This is easily effected in a vertical tube by hanging the lining tube, of an outer diameter smaller than the inner diameter of the carbon tube, within the latter. All supports being relatively cool, any accidental points of contact will burn away. It may be thought best to employ a lining tube, as the gains in the life of the furnace may be more than offset by the lowering of the temperature due to the presence of the lining. This is a matter for consideration in special cases. Naturally the lining tube may project beyond the heating tube and serve to lead gases to and from the hot zone. Further the gases within the hot zone are ionized and conducting and a current may be passed through the gas from auxiliary electrodes, as described in a former case. To make such a furnace convenient to use, particularly for a variety of uses, it is advantageous to assemble its parts in a frame which shall readily assist in assembling and operating the furnace. For example, it is necessary in some instances to apply pressure to the electrodes 1 and 2 tending to force them against the granular mass 4. The electrodes themselves should be guided in their axial motion and be capable of retraction and removal. The containing walls should be held in position. The heat conducted outward through the packing should be harmlessly dissipated. There should be no danger of a short circuit between the electrodes 1 and 2 through the frame. It is frequently an advantage to use the furnace with the tube inclined or horizontal so that the frame should be supported in bearings permitting turning about the axis of the electrodes 1 and 2 and of clamping the frame at any desired angle. To all this may be added the advantage derivable from working under pressure or vacuum or in various gases.

In Fig. 7 is shown the furnace having a suitable supporting frame, one end of which consists of a sleeve, 16, through which the rectangular electrode 2 extends, the structure (not shown) at the opposite sides of the apparatus is the same as that illustrated in Fig. 7. If pressure be desired from but one side or end, the construction may be simplified in ways which need not be illustrated here. The sleeve 16 is cylindrical upon its outside surface and may be rotated in the bearing, 17, which is at the same time a foot or support for the furnace. The sleeve 16 is insulately clamped against the end of the furnace containing box, 18, by means of the ring, 19, and screws, 20, 20. Metallic contact between the sleeve 16 and the bed is prevented by the insulating gaskets, 21. After the active portions of the furnace are in place the hole is surrounded by any suitable heat resisting material, 22, which may be in the form of bricks or loose powder.

In Fig. 7 the bottom of the box 18 is shown provided with an opening, 23, to enable it to be used for squirting silica as specified in connection with Fig. 5. The outer end of the electrode 2 is clamped in a block, 24, to which the current conductor is bolted. Pressure is applied to the electrode 2 by means of the screw 25 going through the nut 26. In Fig. 8 a horizontal section through this latter device is given. To the sleeve 16 is attached a collar, 27, and the said sleeve is provided with a lug at each side. To each lug is attached a spring, 28, which extends to prolongations of the nut 26. Upon turning the screw 25 by means of the hand-wheel, 29, the springs 28 are extended and exert a constant pressure inward on the electrode 2, keeping it constantly in contact with the granular material 4. In case it is desirable to draw back the electrode 2 the screw 25 with its nut 26 is simply drawn back by stretching the springs 28, and the entire compression mechanism bent downward out of the way. The electrode 2 can then be pulled back. The supporting feet 17 are mounted in any convenient way and the furnace can then be operated either in a vertical position as shown, or by turning the furnace bed about the axis of the electrodes 1 and 2 in the bearing 17, the axis 3 can be given any angle for example, it can be made horizontal or adapted to repeat the experiments described by Moissan.

For special purposes where it is necessary that the tube 3 should be evenly heated the arrangement shown in Fig. 9 may be advantageously used. In this we have two sets of electrodes 1 and 2, and 1$^a$ and 2$^a$, respectively. The granular resistance is here shown in the form of a cross having the tube 3 embedded at the middle. The electrodes 1 and 2 are connected into one electric circuit, and electrodes 1$^a$ and 2$^a$ into a second circuit. These circuits may be entirely independent and supplied from separate machines or storage batteries, or they may be operated by a two-phase machine, 30, as shown in the drawing. It is, of course, obvious that with three electrodes, instead of four, a three phase circuit with three connecting wires could be used. Further, it would not be a departure from the spirit of the present invention to use a plurality of tubes embedded in the same granular resistance, nor need these tubes be necessarily of the same diameter nor their axes be parallel. Moreover, a tube need not be circular in cross-section, and may be conical or of any convenient shape without adding to the complication of construction or departing from the invention. I have found that it is of advantage under certain conditions to provide one or more slits in the tube 3, substantially parallel to the axis of the tube. This prevents the current from passing into and around the tube and out on the other side. I also find that when the furnace is to be operated at very high temperatures, the tube is liable to become deformed by reason of the external pressure upon it. In such cases it is found advantageous to provide a tube with one or more rings of graphite for holding it in shape. These modifications are illustrated in Fig. 10, wherein 3 is the tube, slitted at 51, 51, and surrounded by the graphite rings 52, 52. In Fig. 11, I show a lining tube, 53, within the tube, 3, and projecting beyond the same.

I claim as my invention:

1. An electric furnace consisting of a refractory heating resistance composed of free granules clamped between refractory electrodes, together with a refractory hollow body embedded within the said granular resistance.

2. An electric furnace consisting of a refractory heating resistance composed of free graphite granules clamped between refractory electrodes, together with a refractory hollow body embedded within the said granular resistance.

3. An electric furnace consisting of, a granular refractory hollow body embedded within a granular refractory heating resistance clamped between electrodes and means for causing one or more electrodes to be continuously pressed against said granular resistance.

4. An electric furnace consisting of a hollow refractory body embedded within a granular heating resistance, which is held in place by refractory walls having lower electric conductivity than the said granular heating resistance, and by refractory electrodes pressed against the said granular heating resistance.

5. An electric furnace consisting of a vertical hollow refractory body held in place by a refractory plate through which said body passes, and partially surrounded by a heating resistance composed of free granules retained between refractory walls and pressed between suitable electrodes.

6. An electric furnace consisting of a hollow refractory body embedded within a granular heating resistance provided with refractory electrodes and surrounded by refractory packing material within a container so supported as to be capable of turning about an axis substantially at right angles to the axis of the said hollow refractory body.

7. An electric furnace consisting of a hollow refractory body embedded within a granular heating resistance provided with more than two electrodes, said electrodes being so joined to sources of electric potential that each electrode may supply current to a portion of the said granular resistance.

8. An electric furnace consisting of a hollow refractory body embedded within a granular heating resistance, having two pairs of electrodes, the axis of one pair of electrodes being substantially at right angles to the axis of the other pair, each pair of electrodes being connected to a source of energy electrically independent of the other.

9. An electric furnace consisting of a hollow refractory body embedded within a granular heating resistance and having two pairs of electrodes connected respectively to the two sides of a two phase circuit.

10. An electric furnace consisting of a granular heating resistance within which is embedded a refractory tube of conducting material, the conductivity of which in a direction at right angles to its axis, is decreased by a slit or slits in the said tube substantially parallel to its axis.

11. An electric furnace consisting of a granular heating resistance within which is embedded a refractory tube built up of a plurality of longitudinal segments.

12. An electric furnace having a heating resistance composed of granular coke, the grains of which have been coated with graphite.

13. An electric furnace consisting of a granular heating resistance and a refractory tube embedded therein, the said tube being surrounded by one or more supporting rings of graphite.

Signed at New York in the county of New York and State of New York this 10th day of May A. D. 1904.

HENRY NOEL POTTER.

Witnesses:
WM. H. CAPEL,
GEORGE H. STOCKBRIDGE.